United States Patent [19]

Adame

[11] Patent Number: 4,777,991

[45] Date of Patent: Oct. 18, 1988

[54] ROUTER GUIDE

[76] Inventor: Enrique S. Adame, 3003 Jametown Ct., Woodbridge, Va. 22192

[21] Appl. No.: 889,389

[22] Filed: Jul. 25, 1986

[51] Int. Cl.⁴ .................................................. B27C 5/10
[52] U.S. Cl. ............................ 144/134 D; 144/136 C; 409/182
[58] Field of Search .......... 144/134 R, 134 D, 136 R, 144/136 C, 137, 144 R, 144.5; 409/182; 33/27.03, 185 R

[56] References Cited

U.S. PATENT DOCUMENTS

| 1,904,109 | 4/1933 | Wendorf | 144/136 R |
| 2,878,842 | 3/1959 | Pickersgill | 144/134 D |
| 3,494,394 | 2/1970 | Stock | 144/134 D |
| 3,635,268 | 1/1972 | Lange | 144/134 D |
| 4,044,805 | 8/1977 | Gronholz | 144/134 D |

FOREIGN PATENT DOCUMENTS 1320451  1/1963  France ........................... 144/134 D Primary Examiner—W. D. Bray
Attorney, Agent, or Firm—Robert W. Carlson

[57] ABSTRACT

This invention relates to a router guide in general and in particular to a router guide which can follow the edge of a piece of wood whether it be straight or curved to provide a groove in the wood spaced from the edge of the wood. The guide includes an adjustable roller to engage the edge of the wood so that the distance of the groove from the edge of the wood is quickly and easily varied.

4 Claims, 2 Drawing Sheets

ROUTER GUIDE

BACKGROUND OF INVENTION

Guides for routers are well known in the field of carpentry, most of which are designed for a specific use such as shown in U S. Pat. No. 3,104,689, wherein the guide is held stationary against a stringer of a stairway while a router is moved in the area designated by "A" to cut out a portion of the stringer which is to receive a step.

In U.S. Pat. No. 1,904,109 there is disclosed a router guide which is capable of guiding the router in a circle or an arc of a circle. This guide is secured to the work piece.

Applicant is presently producing furniture of rather ornate decor. Many of his pieces are provided with grooves adjacent the edge of the piece and most often the groove follows the contour of the edge. Prior to this invention the grooves had to be cut by hand since no guides were available to perform this function. With the router guide of the invention, the groove may be quickly and easily cut by machine.

THE DRAWINGS

THE INVENTION

The guide 10 comprises an elongated plate 12 having an opening 14 therethrough and extending lengthwise of the plate 12.

Figure 1:
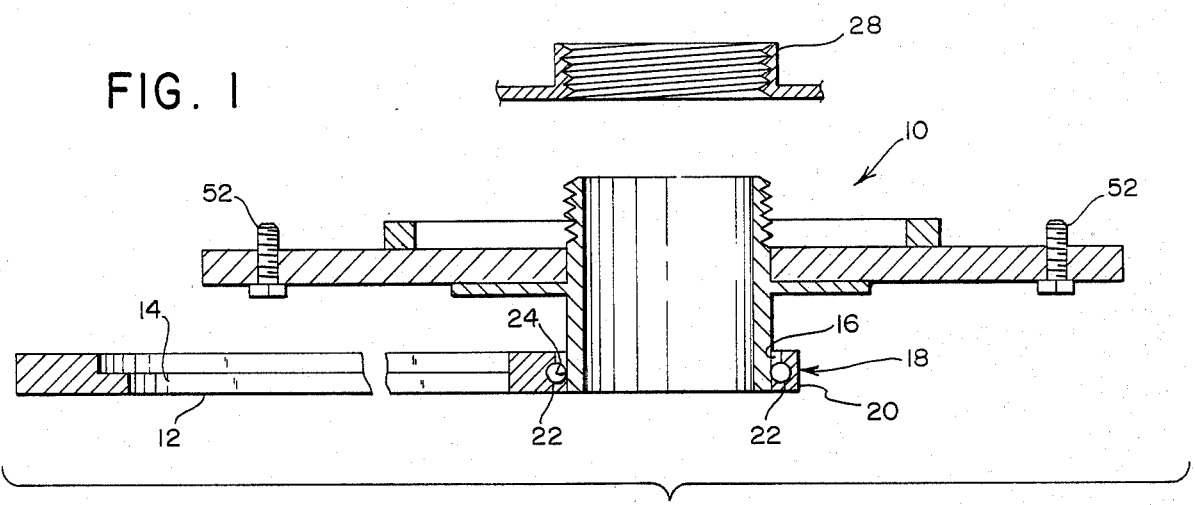
FIG. 1 is a side view of the router guide partially in section.
Figure 2:
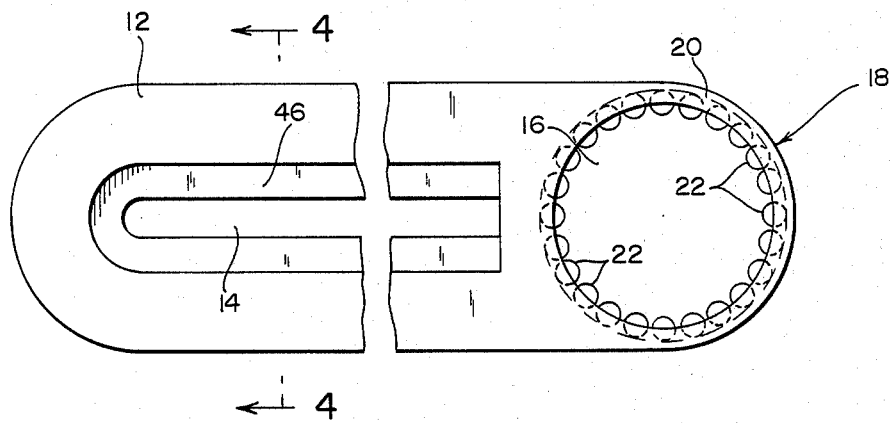
FIG. 2 is a partial plan view of the guide plate.
Figure 3:
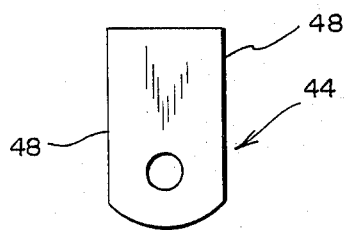
FIG. 3 is a plan view of the securing means for the follower assembly.
Figure 4:
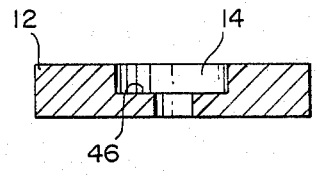
FIG. 4 is a sectional view taken on Line 4—4 of FIG. 2.
Figure 4A:
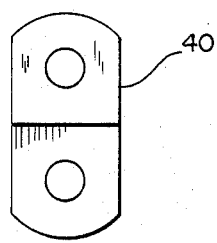
FIG. 4a is a plan view of the follower support plate.
Figure 5:
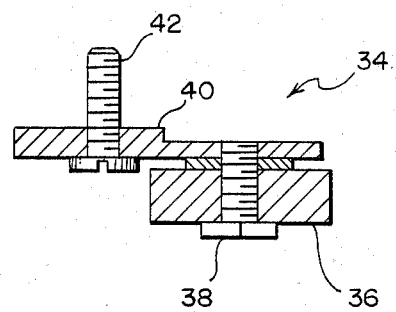
FIG. 5 is a partial sectional view of the follower assembly.
Figure 6:
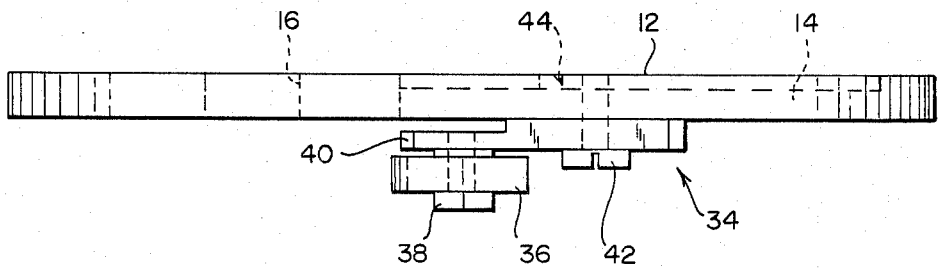
FIG. 6 is a side view of the follower assembly attached to the guide plate; and, FIG. 7 is a side view, partially in section, of the bearing assembly.
Figure 7:
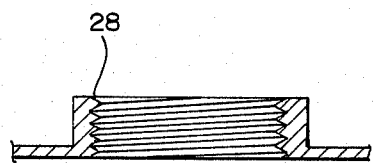
Figure 7:
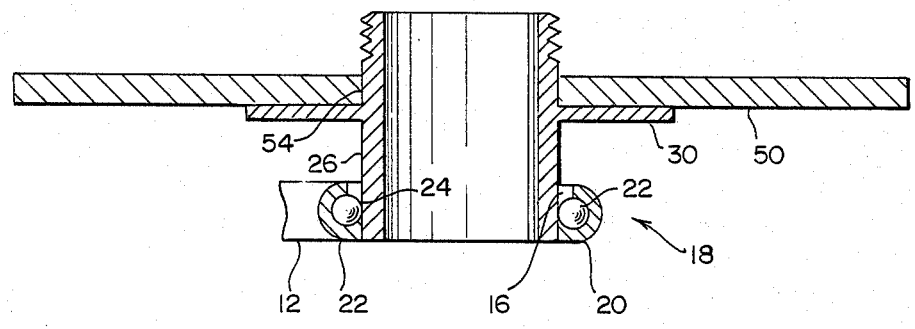

A circular opening 16 is provided adjacent one end of the plate 12 so that the bit of a router may extend there through. A ball bearing assembly 18 is secured to the plate 12 surrounding the opening 16. The assembly 18 comprises an outer race 20, as best shown in FIG. 1, which is rigidly secured to the plate 12, a plurality of balls 22 and an inner race 24.

The inner race 24 has a tubular portion 26 extending perpendicularly therefrom. The end of the portion 26 is threaded to receive a nut 28 and a radially extending flange 30 is provided between the race 24 and the threaded portion.

The plate 12 is provided with a follower assembly 34 which is adapted to engage the edge of a work piece. The follower assembly comprises a roller 36 supported on a screw 38 which is threadably secured to a plate 40. The roller 36 is free to rotate about the screw 38.

The plate 40 is adjustably mounted on the plate 12 by means of a screw 42 extending through the opening 14 and engaging a nut 44. The opening 14 is "T" shaped in cross section so the nut 44 rests on the ledges 46 of the opening. The nut 44 is provided with flat surfaces 48 which engage the walls of the opening so that the nut will not rotate when the screw 42 is engaged therewith.

The guide 10 is secured to a conventional router, not shown, by removing the bottom plate 50 from the router which is secured thereto by a plurality of bolts 52.

The bottom plate 50 is provided with a central opening 54 through which the bit of the router normally extends. The tubular portion 26 is positioned in the opening 54 with the flange 30 abutting the bottom surface of the plate 50. The nut 28 is then screwed down the tubular portion 26 to firmly grip the plate 50 between the flange 30 and the nut.

It will now be apparent that the follower assembly 34 may be selectively positioned along the length of the plate 12 by merely loosening the screw 38 and sliding the assembly along the opening 14. In this manner the router bit may be positioned a selected distance from the edge of a work piece.

The guide is used by positioning the router above the surface of a work piece with the roller 36 engaging the edge of the work piece. As the router with the bit extending through the opening 16 is moved along the work piece, the roller 36 will cause its path of movement to follow the countour of the edge of the work piece.

What is claimed:

1. An attachment for a router for guiding the router in a tortuous path comprising a first member adapted to be rigidly secured to the bottom plate of a router, a second member rotably mounted on said first member, a follower assembly adjustably mounted on said second member, said first member comprises a tube having a threaded portion adjacent one end thereof and a ball bearing assembly secured to the other end, said tube extending through a hole in the bottom plate of the router, a flange extending radially from said tube below said threaded portion and a nut engaging said threaded portion to clamp the tube to the bottom plate of the router.

2. An attachment as set forth in claim 1, wherein said second member comprises an elongated plate having an opening therethrough and extending lengthwise of said plate and said plate being rigidly to the outer race of said ball bearing assembly.

3. An attachment as set forth in claim 2 wherein said follower assembly comprises a plate having a roller rotably mounted thereon and means for selectively mounting said plate on said elongated plate.

4. An attachment as set forth in claim 3 wherein said roller is adapted to engage the edge of a workpiece and guide the router along the top of the workpiece as the router is manually moved over the workpiece.

* * * * *